March 28, 1967 B. BUSSELL ET AL 3,310,976
AIRCRAFT WEIGHT AND CENTER OF GRAVITY APPARATUS
Filed Oct. 17, 1963 3 Sheets-Sheet 1

INVENTORS
BERTRAM BUSSELL
JACK A. ELFENBEIN
BY
Julius L. Rubinstein
ATTORNEY

INVENTORS
BERTRAM BUSSELL
JACK A. ELFENBEIN
BY
*Julius L. Rubinstein*
ATTORNEY

March 28, 1967 B. BUSSELL ET AL 3,310,976
AIRCRAFT WEIGHT AND CENTER OF GRAVITY APPARATUS
Filed Oct. 17, 1963 3 Sheets-Sheet 3

FIG.-6

INVENTORS
BERTRAM BUSSELL
JACK A. ELFENBEIN
BY
*Julius L. Rubinstein*
ATTORNEY

United States Patent Office 3,310,976
Patented Mar. 28, 1967

3,310,976
AIRCRAFT WEIGHT AND CENTER OF
GRAVITY APPARATUS
Bertram Bussell, 1533 Midvale Ave., Los Angeles, Calif.
90024, and Jack A. Elfenbein, 2601 Summit Ridge
Road, Beverly Hills, Calif. 90210
Filed Oct. 17, 1963, Ser. No. 317,025
25 Claims. (Cl. 73—65)

This invention relates generally to a computing circuit and more particularly to an indicator for weighing and locating the center of gravity of an airplane.

The importance of loading an airplane so its center of gravity falls within predetermined limits along the longitudinal axis of the airplane is well known. To provide this necessary information apparatus has been designed which both locates the center of gravity of the airplane and which also weighs the airplane.

The apparatus that has been developed falls within two general classes. In one class, as exemplified by the patent to Kolish #2,872,807, the apparatus is external to the airplane and is usually a permanent installation at an airfield. In the other class, as exemplified by the patent to Goodlet #2,559,718, the apparatus is self-contained in the airplane.

For military purposes the self-contained apparatus is the most desirable because military aircraft may have to be loaded on a crude airfield, where the field itself may not be level, however, the self-contained apparatus so far designed was not sufficiently accurate. This was because the prior apparatus did not compensate for a number of factors which influence the center of gravity of the airplane. For example, in order to determine accurately the center of gravity of an airplane, using the axes of the port and starboard landing gear wheels as a reference, it is essential to know the weight carried by the nose or tail landing gear (depending on the design of the airplane).

If the airplane is exposed to the wind, the wind blowing over the aerodynamic surface of the airplane will exert a lift on the airplane, and this lift will act through the center of gravity of the airplane and will thereby introduce an error into any measurements of the weight supported by the landing gears. The precise effect of this lift on the airplane landing gears due to the wind will depend on the location of the landing gears with respect to the center of gravity of the airplane. For example if an airplane were designed so its center of gravity is on the axis of the port and starboard landing gears, wind-produced lift would lighten only the load carried by the port and starboard landing gears and would have no effect on the weight carried by the nose landing gear, because under these conditions the nose landing gear would be carrying no weight. Conversely if the center of gravity of the airplane were at the nose landing gear, the force of the wind-produced lift would be concentrated entirely at the nose landing gear and it would have to be added to the weight carried by the nose landing gear to determine the true weight of the airplane.

In normal circumstances the center of gravity is intermediate to the nose and port and starboard landing gears, so the effect of the wind-produced lift on the nose landing gear would depend on the distance of the nose landing gear from the longitudinal center of gravity of the airplane.

In other words in order to locate accurately the center of gravity of an airplane exposed to the wind, using conventional moment equations you have to know where the center of gravity of the airplane is located. For this reason in order to design truly precise apparatus for locating the center of gravity of an airplane the apparatus must have a feed-back connection between its output and various parts of the apparatus.

In addition to this, a precise determination of the center of gravity of an airplane exposed to the wind requires a knowledge of the angle of attack of the airplane, the direction of the wind with respect to the longitudinal axis of the airplane and the angle the landing gear struts make with the longitudinal axis of the airplane and with the horizontal.

What is needed therefore and comprises an important object of this invention is to provide a self-contained apparatus for precisely locating the center of gravity of an airplane.

Another important object of this invention is to provide a self-contained apparatus for precisely weighing an airplane.

These and other objects of this invention will become more apparent when understood in the light of the specification and the accompanying drawings wherein.

Figure 1:
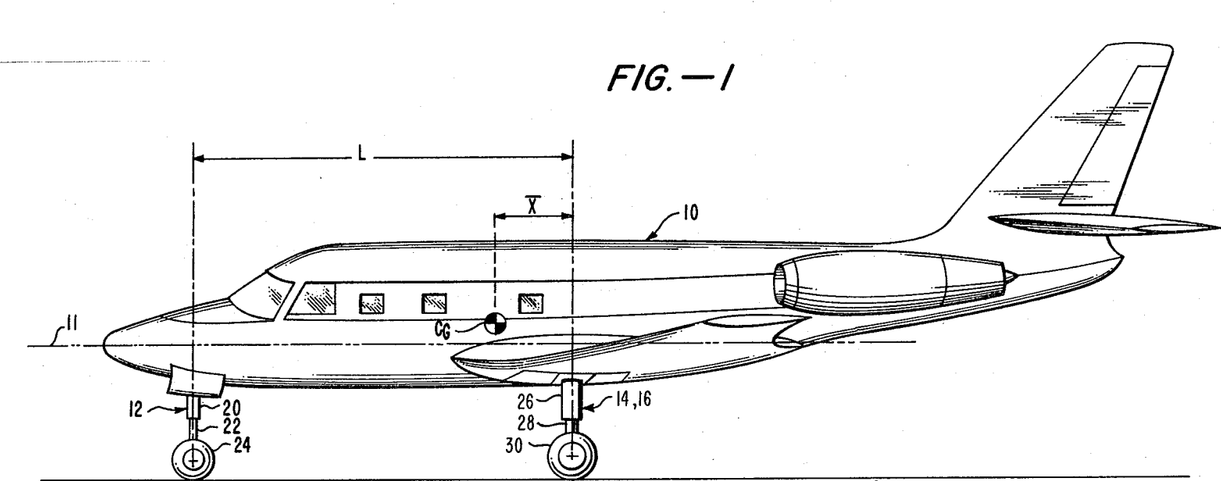
FIG. 1 is a side view of an airplane in which a simplified apparatus is mounted for measuring the center of gravity and the weight.

Referring now to FIG. 1 of the drawing, an airplane, indicated generally by the reference numeral 10 is, in this particular embodiment, provided with a tricycle landing gear. The tricycle landing gear includes a nose landing gear 12 and port and starboard landing gears 14 and 16. It is however, to be understood, that the principles of this invention are equally applicable to airplanes with a rear landing gear instead of a nose landing gear.

The landing gears of the airplane 10, shown in FIG. 1, are perpendicular to the longitudinal axis 11 of the body of the airplane, and the wind velocity is presumed to be zero. However, these presumptions are rarely true and when they are not true, a serious error may be introduced into the computation of the center of gravity of the airplane. However, in order to explain better the principles of this invention, these considerations are neglected in the design of the basic computing circuit shown in FIG. 2 and indicated generally by the reference numeral 18.

As shown in FIG. 1, the separation between the nose and port and starboard landing wheels is a distance L. The total weight of airplane 10 is indicated by $W_t$. The longitudinal center of gravity (C.G.) is a distance X measured from a referenced point which is this case is chosen as the axis of the port and starboard wheels. For equilibrium conditions, the moments around the reference axis must satisfy the following relationship:

$$W_n L = W_t X \qquad (1)$$

where $W_n$ is the weight supported by the nose landing gear,

Hence, $$X = W_n/W_t \times L \text{ and } W_n = X/L \times W_t \qquad (2)$$

Each landing gear contains a pneumatic or hydraulic piston cylinder combination which serves as a shock absorber. In particular the nose landing gear contains a nose strut cylinder 20, a nose piston 22, and a nose wheel 24, see FIG. 3. The port and starboard landing gears contain the port and starboard strut cylinders 26, the port and starboard pistons 28 and the port and starboard wheels 30.

Figure 3:
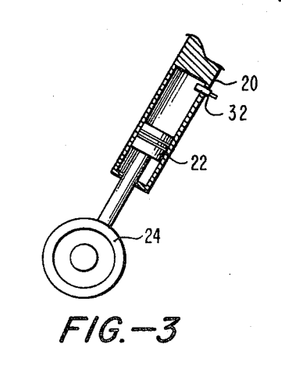
FIG. 3 is a side sectional view of a nose landing strut showing a pressure transducer mounted in a nose strut cylinder.

As shown by way of example in FIG. 3 a pressure transducer 32 is connected to the nose strut cylinder 20 and pressure transducers 34 and 36 are connected to the port and starboard strut cylinders. These transducers may be of the strain gage bridge variety and they produce a voltage output which is in accurate proportion to the pressure within the cylinder. Since the diameter of the strut cylinders is constant, the weight on the pistons in the landing gears is directly proportional to the pressure in the strut cylinders. This pressure is directly proportional to the voltage output of the pressure transducers. As a result the sum of the voltage outputs of the pressure transducers 32, 34, and 36 will be functionally related to the weight of the airplane. It is further noted that the voltage output will be independent of temperature variations.

Figure 2:
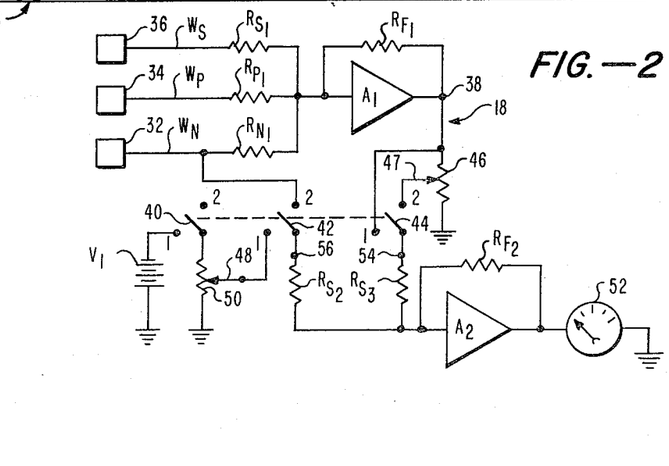
FIG. 2 is a simplified circuit diagram of self-contained apparatus for installation in an airplane, for measuring the weight of the airplane and locating its center of gravity.

As shown in FIG. 2, the voltage output from transducers 32, 34, and 36 produce voltages proportional to the weight $W_n$ carried by the nose landing gear and the weights $W_s$ and $W_p$ carried by the starboard and port landing gears.

These voltages are fed into a summing amplifier $A_1$, see FIG. 2. Amplifier $A_1$ is a high gain amplifier designed so the current flow therethrough is negligible. The resistors $R_{s1}$, $R_{p1}$, $R_{n1}$, and $R_{f1}$ are all equal to provide for the summing effect, in a manner well-known in the art. With this arrangement, the output voltage of amplifier $A_1$ at terminal 38 will be proportional to the sum of the input voltages, and hence will be proportional to the weight of the airplane.

The basic circuit 18 includes a three blade double pole switch. This switch consists of switch blades 40, 42, and 44 and the blades are movable as a unit between terminal poles 1 and 2 respectively. As shown in FIG. 2, terminal 38 is connected to pole 1 of switch blade 44 and to one end of a potentiometer 46. The opposite end of the potentiometer 46 is grounded. Pole 2 of switch blade 44 is connected to the slider 47 of the potentiometer 46.

An adjustable signal generator is provided. This signal generator includes a voltage supply $V_1$ and a potentiometer 50 connected in parallel, as shown in FIG. 2. Pole 1 of switch blade 40 is connected to one terminal of a voltage supply $V_1$, and pole 2 of switch blade 40 is open. Pole 1 of switch blade 42 is connected to the slider 48 of potentiometer 50 while pole 2 of switch blade 42 is connected to the output of pressure transducer 32. Both switch blades 42 and 44 are connected to the input resistors $R_{s2}$ and $R_{s3}$ at the input of summing amplifier $A_2$ which in this case functions as a comparator, as explained below.

The summing amplifier $A_2$ is provided with a feed-back resistor $R_{f2}$, and the resistors $R_{s2}$, $R_{s3}$, and $R_{f2}$ are equal. In addition, the amplifier $A_2$ is selected so that the current flow therethrough is negligible to provide a summing operation. The output of the summing amplifier $A_2$ is connected to a grounded meter 52 as shown. A voltage supply $V_1$ is connected between pole 1 of switch blade 40 and ground, and is opposite in polarity to the voltage output from amplifier $A_1$.

With this arrangement and with the three blade double pole switch at pole 1, the summation of the voltages from transducers 32, 34, and 36 are connected to terminal 54 of resistor $R_{s3}$ and it will be recalled that this voltage is functionally related to the weight of the airplane 10.

As stated above, the voltage on slider 48 of potentiometer 50 is opposite in sign to the voltage output from the summing amplifier $A_1$. As a consequence when slider 48 is moved to where the reading on the meter 42 is zero, the potential between the slider 48 and ground is equal to the voltage output from amplifier $A_1$. Consequently the dial of potentiometer 50 can be calibrated in terms of weight. With this arrangement when the meter 52 reads zero the weight of the airplane will appear on the dial of potentiometer 50.

When the three blade double pole switch is at pole 2, voltage $V_1$ is disconnected from the circuit and the voltage at terminal 56 is the voltage output from transducer 32. This voltage, as stated above, is proportional to the weight $W_n$ carried by the nose landing gear 12, and as indicated in Equation 2, is proportional to the distance $\overline{X}$ of the center of gravity along the longitudinal axis 11 of the airplane. In addition the output from the summing amplifier $A_1$ is connected to one end of a potentiometer 46, which serves as an adjustable voltage multiplying means for multiplying the output signal from the summing amplifier $A_1$ by any desired fraction.

The circuit is arranged so that polarity of the output of the amplifier $A_1$ is opposite to the polarity of the voltages $W_n$ from the nose transducer 32. With this arrangement slider 47 of potentiometer 46 can be moved until the reading on meter 52 is zero. Since as shown in Equation 2, the distance of the center of gravity of the airplane along its longitudinal axis from the reference point on the axes of the port and starboard landing wheels is proportional to the output voltage $W_n$ from transducer 32, potentiometer 46 may be wound linearly and can be calibrated in terms of a longitudinal distance from the reference point. Hence when meter 52 reads zero, the reading on the dial of potentiometer 46 will indicate the distance of the center of gravity along the longitudinal axis of the airplane from the reference point. Thus the computing circuit 18 shown in FIG. 2 provides a self-contained means which is carried by the airplane for determining both the weight of the airplane and its center of gravity.

However, as stated above, in designing the simplified computing circuit shown in FIG. 2 certain factors were ignored which would introduce error into the computation of the center of gravity. These factors are the effect of the wind-produced lift on the aircraft at the time of measurement, the direction of the wind in relation to the nose of the airplane, and the angle of attack of the airplane, taking into consideration the possibility that the landing field may not be horizontal, the angle the landing gears make with the horizontal and with the longitudinal axis of the airplane, and the unsprung weight of the landing gears. These factors must be considered in the design of a unit built into an aircraft because errors in the determination of the center of gravity caused by ignoring them could be very serious.

Figures 4, 5, 7:
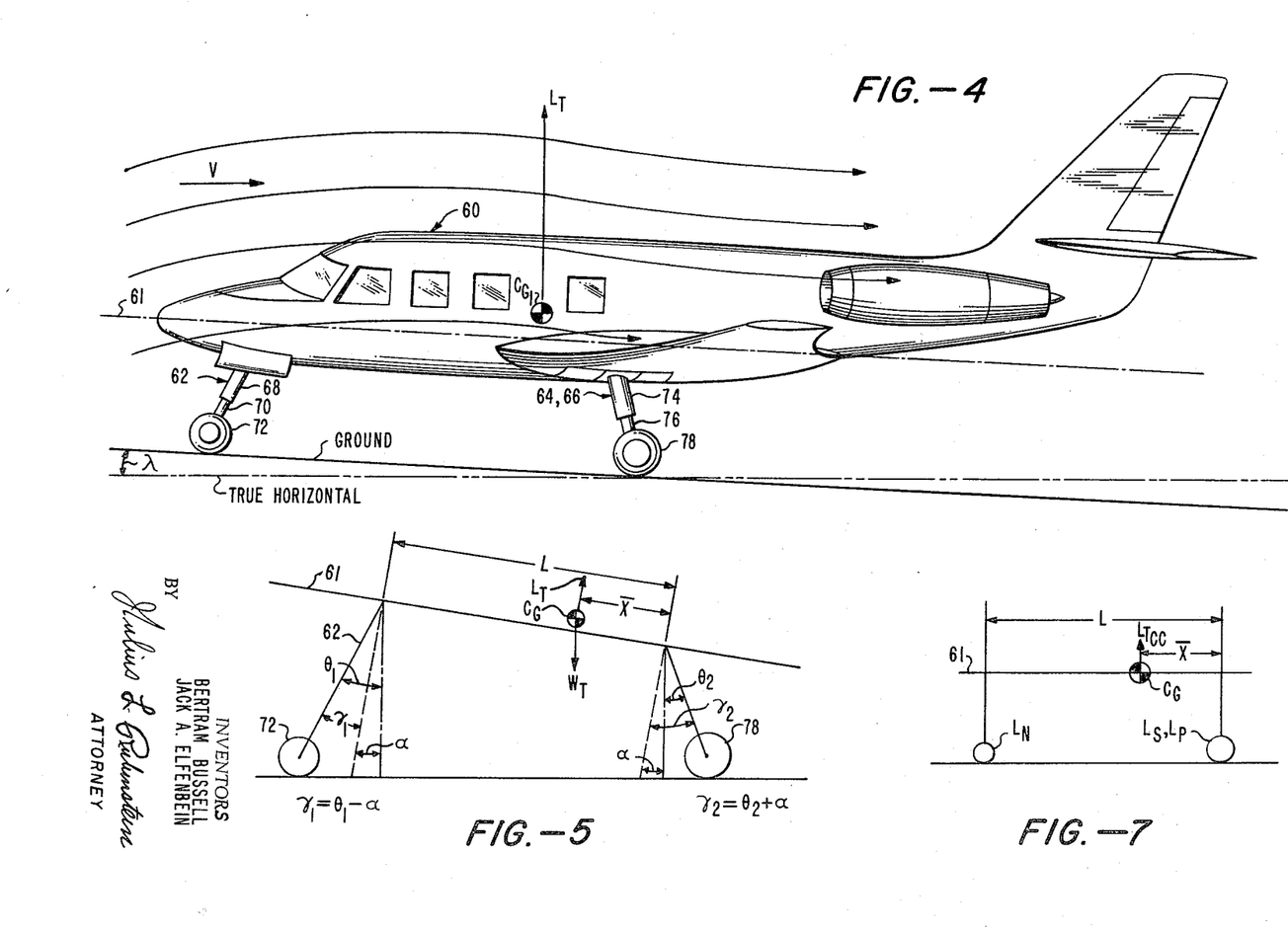
FIG. 4 is a side view of an airplane in which a precise self-contained apparatus is mounted for measuring the center of gravity and the weight of the airplane.
FIG. 5 is a diagrammatic view of the airplane shown in FIG. 4 illustrating the forces exerted on the airplane and showing the location of the landing gear with respect to the longitudinal axis of the airplane.
FIG. 7 is a diagrammatic view showing the effect of wind-produced lift on various parts of the airplane.

To take into account these factors, a more realistic example of an airplane is disclosed in FIG. 4. In this figure wind is shown blowing with a velocity $\vec{V}$ over the aerodynamic surfaces of the airplane. This wind generates a lift force $L_t$ on the airplane which acts through a center of gravity C.G. As shown in the drawing, the runway on which the airplane is resting makes an angle with respect to the horizontal and the various landing gear struts are not perpendicular to the horizontal axes 61 of the airplane. The slope of the runway and the design of the landing gear struts may give the aircraft an angle of attack $\alpha$, as shown in the diagrammatic picture of the airplane in FIG. 5.

In particular the airplane 60 is provided with a nose landing gear 62 and port and starboard landing gears 64 and 66. The nose landing gear 62 is provided with a nose strut cylinder 68, a nose piston 70, and a nose wheel 72. In addition the port and starboard landing gears are provided with port and starboard strut cylinders 74, port and starboard piston 76 and port and starboard wheels.

78. Pressure transducers 80, 82, and 84 are mounted in the nose, port and starboard strut cylinders respectively. These transducers generate voltages $W_n$, $W_p$ and $W_s$ which are related to the weight carried by the nose, port and starboard landing gears respectively, see FIG. 6.

In accordance with aerodynamic theory, wind blowing with a velocity V over the aerodynamic surfaces of an airplane generates a lift force $L_t$ acting at the center of gravity of the airplane. This lift force is proportional to the square of the wind velocity. In other words, $$L_t \sim V^2$$

or $$L_t = KV^2 \qquad (3)$$

where K is proportionally constant, characteristic of a particular airplane.

The lift generated by the wind will offset the weight of the airplane and will thereby decrease the pressure in the nose, starboard, and port strut cylinders. Consequently a determination of the weight of the airplane by a calculation involving a simple summation of the voltage output from transducers 80, 82, and 84 would be in error.

Figure 6:
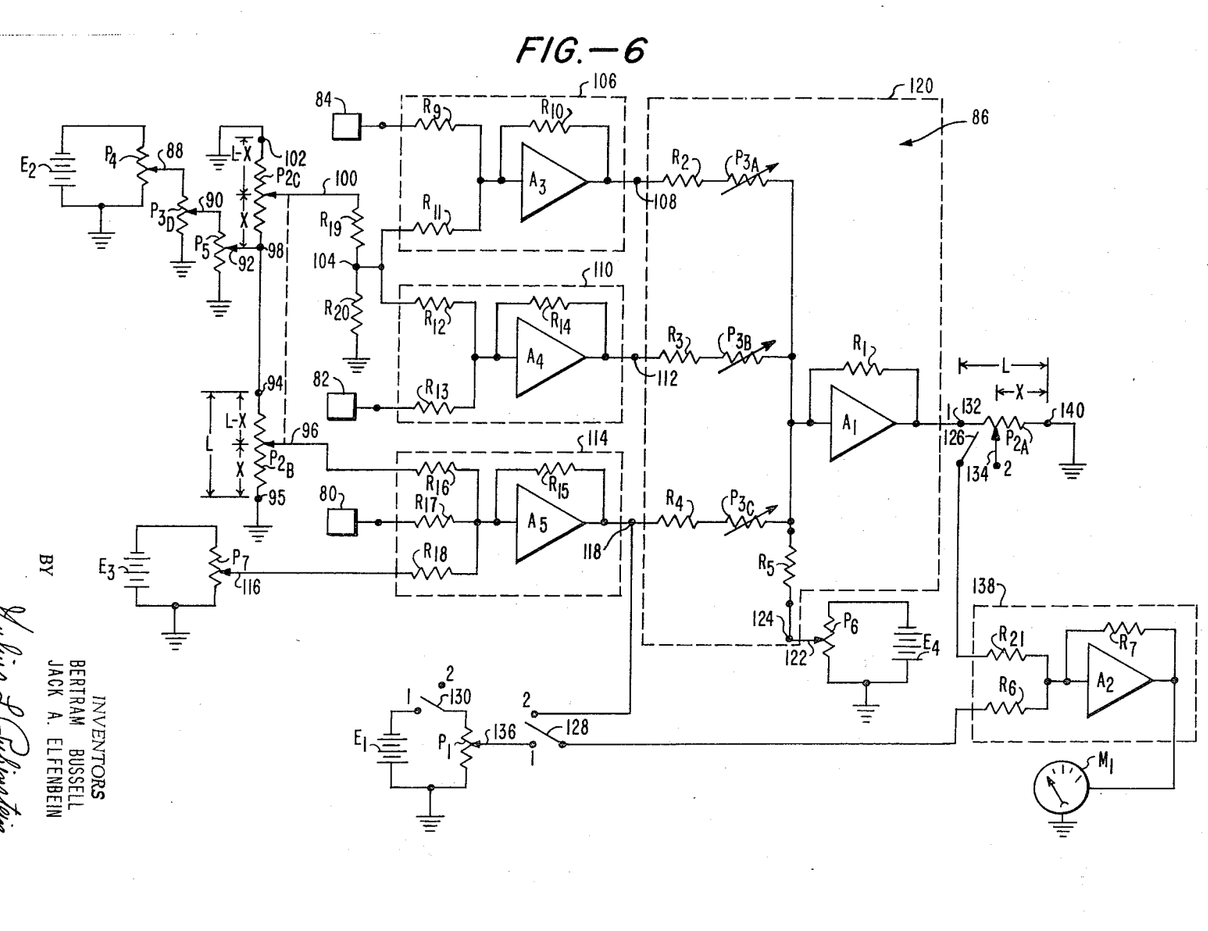
FIG. 6 is a circuit diagram of a self-contained apparatus for precisely weighting and locating the center of gravity of an airplane.

In order to correct this error as well as other factors which were not considered in designing the computing circuit shown in FIG. 2, a more complete computing circuit indicated generally by the reference number 86 is shown in FIG. 6.

As indicated in Equation 3, the lift force $L_t$ due to wind velocity is proportional to the square of the wind velocity. A correction for this wind velocity is introduced into the computing circuit 18 by providing a voltage source $E_2$ in parallel with a potentiometer $P_4$. This also requires that the potentiometer $P_4$ be wound so its resistance value from the slider to the ground point is proportional to the square of the rotational distance of the slider 88. Consequently by a judicious selection of the voltage $E_2$ applied to the ends of the potentiometer $P_4$, the output voltage on slider 88 will be a voltage proportional to the lift of the aircraft due to wind velocity where the lift is considered as acting through the center of gravity.

So far this correction voltage has not taken into consideration the fact that the airplane may not be horizontal because of the slope of the airfield which may be at an angle $\gamma$ with respect to the horizontal and because of the design of the landing gear. Consequently the airplane may have an angle of attack $\alpha$ with respect to the wind velocity, which would decrease the aerodynamic lift due to the wind. In other words the voltage on slider 88 would have to be multiplied by a factor which corrected the angle of attack of the airplane. Mathematically if $L_{tc}$ is designated as the total lift corrected by the angle of attack then, $$L_{tc} = KV^2 C_d(\alpha) \qquad (4)$$

where $C_d$ is the lift coefficient and is a function of $\alpha$.

In practice, the magnitude of the angle of attack is small, and in the range of practical interest $C_d$ is proportional to $\alpha$. Consequently, the potentiometer $P_{3d}$ one end of which is connected to slider 88 and the other end of which is grounded, can be wound linearly. The connection between the slider 88 of potentiometer $P_4$ and one end of potentiometer $P_{3d}$ performs a multiplication operation so that if potentiometer $P_{3d}$ is calibrated in terms of $\alpha$, the potential on slider 90 multiplies the lift $L_t$ by $C_d(\alpha)$ and corrects the lift force $L_t$ for the angle of attack. Hence the voltage on slider 90 represents the lift force $L_{tc}$ as corrected by the angle of attack of the airplane.

If the nose of the airplane is not perpendicular to the wind direction, a further correction is required. It is clear that to correct for this factor the voltage appearing on slider 90 and which represents the value $L_{tc}$, must be multiplied by the cosine of the angle between the nose or longitudinal axis of the aircraft and the wind direction.

If the symbol $L_{tcc}$ represents the effect of the wind velocity taking into account the angle of attack of the airplane and correcting for the angle between the nose or longitudinal axes of the airplane and the wind direction, then, $$L_{tcc} = KV^2 C_d(\alpha) \cos \beta \qquad (5)$$

where $\beta$ is the angle the wind direction makes with respect to the nose or longitudinal axis of the airplane.

This further multiplication requires the slider 90 of potentiometer $P_{3d}$ to be connected to one end of a grounded potentiometer $P_5$. Potentiometer $P_5$ is wound so the resistance value between slider 92 and ground is proportional to the cosine of the angular markings on the dial associated with the rotary shaft of potentiometer $P_5$. With this arrangement, the potential on slider 92 is proportional to $L_{tcc}$.

It is to be noted however that the lift force $L_{tcc}$ acts through the center of gravity of the aircraft. Consequently this lift force must be broken down so the actual decrease in the weight on each individual landing strut in the landing gear is determined.

This can be calculated by referring to the diagram shown in FIG. 7 where the moment of force around the axes of the starboard and port wheels caused by the flow of wind over the aerodynamic surfaces of the airplane are considered. As shown in the drawing, the lift force $L_{tcc}$ is exerted through the center of gravity of the airplane. The center of gravity is at a distance $\overline{X}$ along the longitudinal axis 61 starting from the axes of the port and starboard landing wheels. Hence using the axes of the port and starboard landing wheels as a reference point again, the moment equation due only to the lift force caused by the wind is as follows:

$$L_{tcc}\overline{X} = L_n L \qquad (6)$$

where $L_n$ is the lift force exerted on the nose wheel, or $L_n = L_{tcc}\overline{X}/L$
Since $$L_{tcc} = L_n + L_p + L_s \qquad (7)$$

where $L_p$ and $L_s$ are the lift forces due to the wind as they affect the weight carried by the port and starboard landing gears respectively, then $$L_p + L_s = L_{tcc} - L_n \qquad (8)$$

and substituting for $L_n$ from Equation 6

$$L_p + L_s = L_{tcc} - L_{tcc}X/L$$

where $\overline{X}$ is measured along the longitudinal axis of the airplane from the reference point of the axes of the port and starboard landing wheels. Consequently, $$L_p + L_s = L_{tcc}(1 - \overline{X}/L) \qquad (9)$$

As stated above, the potential $L_{tcc}$ on slider 92 is proportional to the lift force caused by wind velocity passing over the aerodynamic surfaces of the airplane and taking into account the angle of attack of the airplane and correcting for the angle between the nose or longitudinal axes of the airplane and the wind direction. Since the airplane is assumed to be symmetrically loaded around its longitudinal axis 61 we may assume, $$L_p = L_s \qquad (10)$$

Hence, $$L_p = L_s = \tfrac{1}{2} L_{tcc}(1 - \overline{X}/L) \qquad (11)$$

Recalling $L_n = L_{tcc}\overline{X}/L$ we need only multiply the potential on slider 92 by the factor $\overline{X}/L$ to get the effect of the lift of the airplane on the nose landing gear. For this reason slider 92 is connected to terminals 94 and 98 of the grounded potentiometers $P_{2b}$ and $P_{2c}$ which serve as first and second adjustable voltage multipliers in that they can multiply the potential on slider 92 by any desired fraction. Potentiometers $P_{2b}$ and $P_{2c}$ are wound linearly so the total resistance of each is proportional to L. With respect to potentiometer $P_{2b}$, the distance of the slider 96 from ground terminal 95 is X. Hence for some position of slider 96 its potential will be $L_{tcc}\overline{X}/L$.

Potentiometer $P_{2c}$ is identical to potentiometer $P_{2b}$ and is connected to potentiometer $P_{2b}$ as shown in the drawing with its terminal 98 connected to slider 92, the distance of slider 100 from terminal 98 is as shown. Sliders 100 and 96 are ganged together on a common shaft in such a way that when slider 100 is at grounded terminal 102, slider 96 is at terminal 94, and when slider 100 is at terminal 98, slider 96 is at grounded terminal 95.

With this arrangement, it can be seen that the potential on slider 96 is $L_{tcc}X/L$ and the potential on slider 100 is $L_{tcc}(1-X/L)$. Furthermore if $X=\overline{X}$ the distance of the longitudinal center of gravity on the longitudinal axis of the airplane from the reference axes of the port and starboard wheel, then the potential of slider 96 represents the lift force on the nose landing gear due to the wind.

As stated above $L_p=L_s=\frac{1}{2}L_{tcc}(1-\overline{X}/L)$. Hence if potentiometer $P_{2b}$ and $P_{2c}$ are set so $X=\overline{X}$ the potential on slider 100 will be proportional to twice the effect of the lift force on the port and starboard landing gears.

To divide this potential in half slider 100 is connected to one end of a grounded dividing network comprising resistors $R_{19}$ and $R_{20}$ in series. $R_{19}=R_{20}$, hence the potential at terminal 104 between resistances $R_{19}$ and $R_{20}$ will be $\frac{1}{2}L_{tcc}(1-X/L)$, and if $X=\overline{X}$, the potential at terminal 104 will be equal to the lift force due to the wind on the port and starboard landing gears.

A primary summing network 106 includes summing amplifier $A_3$ and resistances $R_9$, $R_{10}$, and $R_{11}$ connected as shown. A pressure transducer 84 connected to the cylinder on the starboard landing gear serves as one input to the summing network 106 while the potential at terminal 104 described above serves as the other input. Resistances $R_9$, $R_{10}$, and $R_{11}$ are equal in value and are selected so the output of the summing network at terminal 108 is a voltage related to the weight of the airplane on the starboard landing gear corrected by the effect of the lifting force on the airplane due to the wind velocity as it effects that landing gear.

Similarly a primary summing network 110 includes a summing amplifier $A_4$ and resistances $R_{12}$, $R_{13}$ and $R_{14}$ connected as shown. Pressure transducer 82 connected to the port landing gear serves as one input to the summing network 110 while the potential at terminal 104 described above serves as the other input. Resistances $R_{12}$, $R_{13}$ and $R_{14}$ are equal in value and are selected so the output of the summing network 110 at terminal 112 is a voltage related to the weight of the airplane on the port landing gear corrected by the effect of the lift force on the airplane due to wind velocity on that landing gear.

A further primary summing network 114 includes a summing amplifier $A_5$ and resistances $R_{15}$, $R_{16}$, $R_{17}$, and $R_{18}$ connected as shown. Pressure transducer 80 connected to the nose landing gear serves as one input to the summing network while the potential on slider 96, which as stated above is a voltage related to the effect of the lifting force of the wind on the nose landing gear serves as another input. In large airplanes the landing gear is quite heavy and referring to FIG. 3 the weight of the piston 22 and wheels 24 between the landing gear strut cylinder and the ground may be quite substantial. It is noted, however, that the pressure transducer 80 in the nose strut cylinder would reflect only the weight above the piston. Hence in large airplanes the weight, the so-called unsprung weight which includes the pistons and wheels could be substantial enough to introduce an important error into the calculation of the center of gravity, if this weight is not taken into account. This unsprung weight is a fixed value, characteristic of a particular airplane and it is a simple matter to correct for it. In particular referring to FIG. 6, a potential source $E_3$ is in parallel with a linear potentiometer $P_7$. The dial of this potentiometer may be calibrated in terms of the unsprung weight of the nose landing gear, and for a particular airplane the slider 116 would be moved to a value such that its potential is proportional to the unsprung weight of the nose landing gear. In use the setting of slider 116 would normally not be disturbed once it is installed in a particular airplane. This potential constitutes a third input into the summing network 114. Consequently the output of summing network 114 at terminal 118 is a potential which is proportional to the weight on the nose landing gear corrected by the lifting effect of the wind and the unsprung weight of the nose landing gear.

To this point there has been an assumption that the landing gear is perpendicular to the longitudinal axis of the airplane, as shown in FIG. 1. This however is not realistic and in practice the landing gear may be at an angle to the longitudinal axis of the airplane as shown in FIGS. 4 and 5.

The fact that the landing gear is at an angle to the longitudinal axis of the airplane introduces an error into the output signal of the pressure transducers which must be corrected in order for circuit 86 to compute the center of gravity with sufficient accuracy.

The necessary corrections can be determined by referring to the diagram of the airplane shown in FIG. 5. As shown, the nose landing strut is at an angle $\gamma_1$ with respect to the perpendicular to the longitudinal axis 61 of the body of the airplane, while the port and starboard landing gears are at an angle $\gamma_2$ to the perpendicular to the longitudinal axes of the airplane.

If the angle of attack of the airplane is $\alpha$ and the nose landing strut is at an angle $\theta_1$ with respect to the horizontal and the port and starboard landing gears are an angle $\theta_2$ with the horizontal; then the following relationships are true, $$\gamma_1=\theta_1-\alpha$$

and $$\gamma_2=\theta_2+\alpha \quad (12)$$

Since the pressure transducers 80, 82, and 84 are in landing gear struts, which are connected to the airplane at an angle to the longitudinal axis of the airplane and to the horizontal, the signal from these transducers must be corrected by multiplying them by the cosine of the angle the landing gear struts make with the longitudinal axis of the aircraft. In other words, as shown in FIG. 5 the signal from the transducer 80 in the nose landing gear must be multiplied by the cosine $\gamma_1$ while the signals from transducers 82 and 84 in the port and starboard landing gears must be multiplied by cosine $\gamma_2$.

To do this resistance $R_1$, $R_2$, $R_3$ and potentiometers $P_{3a}$ and $P_{3b}$ are selected and adjusted so that $$\frac{R_1}{R_2+P_{3a}}$$

and $$\frac{R_1}{R_3+P_{3b}}$$

equals cosine $\gamma_2$.

With regard to the nose landing strut, $R_1$, $R_4$ and potentiometer $P_{3c}$ are selected and adjusted so $$\frac{R_1}{R_4+P_{3a}}$$

equals cosine $\gamma_1$.

The secondary summing network 120 constitutes summing amplifier $A_1$ and resistances $R_1$, $R_2$, $R_3$, $R_4$, and $R_5$ along with potentiometers $P_{3a}$, $P_{3b}$ and $P_{3c}$. Potentiometers $P_{3a}$, $P_{3b}$ and $P_{3c}$ are all on a common shaft along with potentiometer $P_{3d}$ because the setting of these potentiometer reflects the influence of the angle of attack α of the airplane in difference parts of the computing circuit.

As stated above, the unsprung weight of the nose landing gear, comprising the weight of the nose piston and nose wheel has been compensated for by the circuit comprising voltage source $E_3$ and potentiometer $P_7$. This correction has been introduced at the input of summing amplifier $A_5$. However, the point in the computing circuit where this correction is made is not particularly critical and the same consideration applies to corrections for the unsprung weight for port and starboard landing gears. The unsprung weight of the port and starboard landing gears comprising the port and starboard pistons and wheels is a fixed value characteristic of a particular airplane. For this reason voltage source $E_4$ is connected in parallel with linear potentiometer $P_6$. With this arrangement potentiometer $P_6$ can be calibrated in terms of weight and the potential of slider 122 of potentiometer $P_6$ will at some position be proportional to the unsprung weight of the port and starboard landing gears. This voltage is introduced into summing network 120 at terminal 124.

With the computing circuit 120 described to this point, the input to the summing amplifier $A_1$ constitutes the loads carried by the landing struts taking into consideration the lift force on the airplane caused by the wind velocity and corrected by the angle the landing gear struts make with the horizontal axis 61 of the airplane and with the horizontal. Furthermore, the unsprung weight of the nose piston and wheels in the landing gear is compensated for. Consequently the output of summing amplifier $A_1$ will be a voltage proportional to the weight of the airplane.

As described, in connection with the simplified circuit 18 shown in FIG. 2, a three blade double pole switch is also provided in computing circuit 86. This switch consists of blades 126, 128 and 130 and the blades are movable as a unit between terminal poles 1 and 2 respectively.

As shown in FIG. 6 terminal 132 is connected to pole 1 of switch blade 126 and to one end of potentiometer $P_{2a}$. The opposite end of potentiometer $P_{2a}$ is grounded. Pole 2 of switch blade 126 is connected to the slider 134 of potentiometer $P_{2a}$. Pole 1 of switch blade 130 is in an adjustable signal generator. This signal generator comprises a voltage supply $E_1$ in parallel with a potentiometer $P_1$. In particular pole 1 is connected to one terminal of a voltage supply $E_1$ and pole 2 of switch blade 130 is open. Pole 1 is of switch blade 128 is connected to slider 136 of potentiometer $P_1$ and pole 2 of switch blade 128 is connected to terminal 118 at the output of the primary summing network 114.

When the three blade double pole switch is at pole 1, the output of summing network 120 constitutes one input to a third summing network 138 and the adjustable signal generator comprising voltage source $E_1$ and potentiometer $P_1$ constitutes the other input to the summing network 138.

As shown in the drawing the summing network 138 comprises resistors $R_{21}$, $R_6$, and $R_7$ along with amplifier $A_2$. As described above resistors $R_{21}$, $R_6$ and $R_7$ are all equal. The adjustable signal generator comprising voltage source $E_1$ and potentiometer $P_1$ are connected so they have a polarity opposite to the output of the secondary summing network 120.

With this arrangement the summing network 138 will subtract the two voltage inputs from each other, so that if the voltage on slider 136 is equal in magnitude to the output of the secondary summing network 120, the output of the summing network 138 will be zero. This condition can be observed if a meter $M_1$ is connected to the output of the summing network 138 as shown. If therefore, the dial of linear potentiometer $P_1$ is calibrated in terms of weight, the true weight of the airplane can be determined by throwing the three blade switch to pole 1 and adjusting slider 136 until the meter $M_1$ has a zero indication, and reading the weight on the dial of potentiometer $P_1$.

When the three blade switch is at pole 2, the output of the primary summing network 114 constitutes one input of the summing network 138. The other input is from slider 134 of potentiometer $P_{2a}$. But the output of summing network 114, as explained above constitutes the corrected value of the effect of the weight of the airplane on the nose landing gear. This weight is proportional to the longitudinal distance of the center of gravity of the airplane from the reference axes of the port and starboard landing wheels, see Equation 2. Consequently the dial of potentiometer $P_{2a}$ is linear and can be calibrated in terms of distance.

When slider 134 is moved until the meter $M_1$ has a zero reading, the distance of slider 134 from terminal 140 will be proportional to the longitudinal distance of the center of gravity of the airplane from the axis of the port and starboard wheels. Consequently the position of the center of gravity on the longitudinal axis of the airplane can be read directly on the dial of potentiometer $P_{2a}$.

In use the computing circuit 86 is mounted in the airplane and with the pressure transducers connected to the cylinders of the landing gear struts. Information as to the wind velocity is fed into the circuit by properly adjusting the slider 88 of potentiometer $P_4$. Information relating to the angle of attack of the airplane, which depends on the design of the airplane and the slope of the ground is determined and fed into the circuit by adjustment of slider 90 of potentiometer $P_{3d}$. At the same time however since potentiometers $P_{3a}$, $P_{3b}$, and $P_{3c}$ are on the same shaft as potentiometer $P_{3d}$, adjustment of slider 90 also adjusts these other potentiometers and corrects the circuit for the angle which the landing gear struts make with the longitudinal axis of the airplane and with the horizontal. Consequently potentiometers $P_{3a}$, $P_{3b}$, $P_{3c}$, and $P_{3d}$ serve as a combined means for introducing corrections in the computing circuit 86 both for the effect of the angle of attack of the airplane as to the wind velocity and also for the angle the landing gears make with the body of the airplane, which as explained above, also depends upon the angle of attack.

The angle between the nose of the airplane and the wind direction if fed into the airplane by appropriate adjustment of slider 92 of potentiometer $P_5$ as described above.

In order to take into account properly the effect of the lift forces of the airplane as they effect the transducers connected to the landing gear, the three blade double pole switch must first be thrown to the pole 2 position. Potentiometers $P_{2a}$, $P_{2b}$, and $P_{2c}$ are all connected to the same shaft and when slider 134 is moved sliders 100 and 96 are adjusted similarly in a feed-back arrangement. Since potentiometers $P_{2b}$ and $P_{2c}$ have been described as first and second voltage multiplying means, potentiometer $P_{2a}$ may be described as a third voltage multiplying means. Consequently when slider 134 is adjusted so the output of meter $M_1$ is zero, the sliders 100 and 96 of potentiometers $P_{2d}$ and $P_{2c}$ will have been adjusted properly to take into account the lift effect of the wind velocity as it effects the readings on the transducers. As stated above, slider 116 of potentiometer $P_7$, and slider 122 of potentiometer $P_6$ need only be adjusted once after installation in the airplane because the unsprung weight of the airplane landing gear is constant.

It is further noted that in adjusting slider 134 to a position where the meter $M_1$ has a zero reading, two thinks are accomplished. First of all the location of the center of gravity can be read on the dial of the potentiometer and secondly the primary summing networks 106, 110 and 114 are all precisely corrected for the lifting effects of the wind velocity as it effects the pressure in the cylinders in the landing struts.

After this when the three blade switch is thrown to the pole 1 position, the lifting effect due to wind velocity and its effects on the output from the transducers 80, 82 and 84 will have been corrected for by the above described feedback arrangement and it is only necessary to move slider 136 of potentiometer $P_1$ until the meter $M_1$ once more has a zero output. At this time the weight of the airplane can be read on the dial of potentiometer $P_1$.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

It is further understood that the principles of this invention can be practiced using other devices, such as strain gages or optical comparators for measuring the loads carried by the landing gears.

What is claimed is:

1. A center of gravity indicator for a vehicle having port and starboard ground supports and a third ground support in longitudinally spaced relation to a line connecting said port and starboard ground supports, comprising separate load transducers, each load transducer associated with a particular ground support, said load transducers mounted on and carried by said vehicle for converting the load carried by said ground supports into separate electrical potentials, a first summing amplifier, said three separate electrical potentials comprising the input to said first summing amplifier whereby the output of said first summing amplifier is an electrical voltage functionally related to the weight of said vehicle, adjustable voltage multiplying means calibrated in terms of distance connected to the output of said first summing amplifier for multiplying the output signal of said first summing amplifier by any desired fraction, a second summing amplifier, the output from said load transducer associated with said third ground support comprising a first input to said second summing amplifier, the output from said adjustable voltage multiplying means comprising a second input to said second summing amplifier, the first and second inputs to said second summing amplifier opposite in polarity, and means for indicating when the output of said second summing amplifier is zero whereby the location of the center of gravity of the vehicle can be read on the calibrations of the adjustable voltage multiplying means.

2. A combined weight and center of gravity indicator for a vehicle having port and starboard ground supports and a third ground support in longitudinally spaced relation to a line connecting said port and starboard ground supports comprising separate load transducers, each load transducer associated with a particular ground support, said load transducers mounted on and carried by said vehicle for converting the load carried by said ground supports into separate electrical potentials, a first summing amplifier, said separate electrical potentials comprising the input to said summing amplifier, an adjustable signal generator calibrated in terms of the weight of the vehicle, adjustable voltage multiplying means calibrated in terms of the distance, said adjustable voltage multiplying means adapted to be connected to the output of said first summing amplifier for multiplying the output of said first summing amplifier by any desired fraction, a second summing amplifier, a two position switch for alternately connecting the adjustable signal generator and the output of said first summing amplifier to the input of said second summing amplifier, or connecting the output of the load transducer associated with said third ground support and the output of said adjustable voltage multiplying means to said second summing amplifier, and means connected to said second summing amplifier for indicating when the signal from the adjustable signal generator equals the output from said first summing amplifier or when the output from said load transducer connected to the third ground support equals the output from said adjustable voltage multiplying means whereby in one position of the switch the weight of the vehicle can be read on the calibrations of the adjustable signal generator and in another position of the switch the location of the center of gravity of the vehicle can be read on the calibrations on the adjustable voltage multiplying means.

3. A center of gravity indicator for an airplane having port and starboard landing gears and a third ground support, in longitudinally spaced relation to a line connecting said port and starboard landing gears comprising separate load transducers, a load transducer associated with each landing gear and said third ground support, said load transducers mounted on and carried by said airplane for converting the load carried by said landing gears and said third ground support into separate electrical potentials, a primary summing amplifier associated with each load transducer whereby each load transducer serves as one input to the associated primary summing amplifier, first means for converting the total lift force caused by wind blowing over the aerodynamic surfaces of the airplane and acting through the center of gravity of the airplane into an electrical potential, said first means connected to a second means for converting the electrical potential representing the total lift force acting through the center of gravity of the airplane into separate electrical potentials, each of said separate electrical potentials proportional to the magnitude of the lift force acting on the port and starboard landing gears and on the third ground support respectively and serving as a second input to the primary summing amplifier associated with each load transducer whereby each summing amplifier has one input from an associated load transducer and one input from the electrical potential representing the effect of the wind produced lift force acting on the associated landing gear so that the output of each primary summing amplifier is a potential related to the weight carried by the associated landing gear or ground support taking into account the effect of wind produced lift on the particular landing gear or ground support, a secondary summing amplifier, the output of the primary summing amplifiers serving as the input to the secondary summing amplifier whereby the output of the secondary summing amplifier is a potential proportional to the weight of the airplane taking into account the effect of wind produced lift acting on the airplane, adjustable voltage multiplying means connected to the output of said secondary summing amplifier, said adjustable voltage multiplying means calibrated in terms of distance for multiplying the output signal of said secondary summing amplifier by any desired fraction, a comparator, the output of the primary summing amplifier associated with the third ground support and the output of said adjustable voltage multiplying means connected to said comparator, and means connected to said comparator for indicating when the output from the primary summing amplifier associated with said third ground support equals the output from said adjustable voltage multiplying means whereby the location of the center of gravity of the airplane can be read on the calibrations of the adjustable voltage multiplying means.

4. A center of gravity indicator for an airplane having port and starboard landing gears and a third ground support in longitudinally spaced relation to a line connecting said port and starboard landing gears comprising separate load transducers, one load transducer associated with each landing gear and said third ground support, said load transducers mounted on and carried by said airplane for converting the load carried by said landing gears and said third ground support into separate electrical potentials, a primary summing amplifier associated with each load transducer whereby each load transducer serves as one input to the associated primary summing amplifier, first means for converting the total lift force caused by wind blowing over the aerodynamic surfaces of the airplane into an electrical potential, first and second adjustable voltage multiplying means connected to said first means for multiplying said electrical potential representing the said lift force on the airplane by any desired fraction, the output of said first adjustable voltage multiplying means serving as a second input to the primary summing amplifier associated with said third ground support, the output of said second voltage multiplying means serving as second inputs to the primary summing amplifiers associated with said port and starboard landing gears so that the output of each primary summing amplifier is the summation of the output of the associated load transducer and the output of a voltage multiplying means, a secondary summing amplifier, the output of the primary summing amplifiers serving as the input to the secondary summing amplifier, a third adjustable voltage multiplying means connected to the output of said secondary summing amplifier, for multiplying the output of said secondary summing amplifier by any desired fraction, said third adjustable voltage multiplying means calibrated in terms of distance, feed-back means connecting said third adjustable voltage multiplying means with said first and second voltage multiplying means whereby when said third voltage multiplying means is varied said first and second voltage multiplying means are varied, a comparator, the output of the primary summing amplifier associated with said third ground support and the output of said third adjustable voltage multiplying means connected to the comparator, and means connected to the comparator for indicating when the adjustment of the third adjustable voltage multiplying means is such that its output equals the output of the primary summing amplifier associated with said third ground support, whereby the location of the center of gravity of the airplane can be read on the calibrations of the third adjustable voltage multiplying means, and the said adjustment of the third adjustable voltage multiplying means adjusts said first and second voltage multiplying means in such a way that the output of said first and second voltage multiplying means is a potential proportional to the effect of the wind produced lift on the third ground support and on the port and starboard landing gears respectively.

5. A center of gravity indicator for an airplane having port and starboard landing gears and a third ground support in longitudinally spaced relation to a line connecting said port and starboard landing gears comprising separate load transducers, a load transducer associated with each landing gear and said third ground support, said load transducers mounted on and carried by said airplane for converting the load carried by said landing gears and said third ground support into separate electrical potentials, first means for converting the total lift force carried by wind blowing over the aerodynamic surfaces of the airplane into an electrical potential, first and second adjustable voltage multiplying means connected to said first means for multiplying said electrical potential representing the lift force on the airplane by any desired fraction, a primary voltage summing means associated with each load transducer, the inputs to each of said primary voltage summing means comprising the output from a load transducer and one of said adjustable voltage multiplying means whereby the output of each primary voltage summing means is the summation of the output voltage of the associated load transducer and the voltage multiplying means connected to the input to said primary voltage summing means, a secondary voltage summing means, the output of all the primary voltage summing means connected to the input of the secondary voltage summing means, a third adjustable voltage multiplying means connected to the output of said secondary voltage summing means for multiplying the output of said secondary voltage summing means by any desired fraction, said third adjustable voltage multiplying means calibrated in terms of distance, feed-back means connecting said third adjustable voltage multiplying means to said first and second voltage multiplying means whereby when said third voltage multiplying means is adjusted, said first and second voltage multiplying means are likewise adjusted, a comparator, the output of the primary voltage summing means associated with said third ground support and the output of said third adjustable voltage multiplying means connected to said comparator, and means connected to said comparator for indicating when the adjustment of the third voltage multiplying means is such that its output equals the output of the primary voltage summing means associated with said third ground support whereby the location of the center of gravity of the airplane can be read on the calibrations of the third adjustable voltage multiplying means and the said adjustment of the third adjustable voltage multiplying means adjusts said first and second voltage multiplying means in a potential proportional to the effect of the wind produced lift on the third ground support and on the port and starboard landing gears respectively.

6. A combined weight and center of gravity indicator for an airplane having port and starboard landing gears and a third ground support in longitudinally spaced relation to a line connecting said port and starboard landing gears comprising separate load transducers, each load transducer associated with a particular landing gear or ground support and mounted on and carried by said airplane for converting the load carried by said landing gears and said third ground support into separate electrical potentials, first means for converting the total lift force caused by wind blowing over the aerodynamic surfaces of the airplane into an electrical potential, first and second adjustable voltage multiplying means connected to said first means for multiplying said electrical potential representing the total lift force on the airplane by any desired fraction, a first voltage summing means, the output of the load transducer associated with said third ground support serving as one input to said first voltage summing means and the output of said first adjustable voltage multiplying means serving as the other input to said first voltage summing means, a second voltage summing means, the output of the load transducers associated with said port and starboard landing gears, the output of the second voltage multiplying means and the output of said first voltage summing means serving as the input to said second voltage summing means, a third adjustable voltage multiplying means connected to the output of the second voltage summing means for multiplying the output of said second voltage summing means by any desired fraction, said third adjustable voltage multiplying means calibrated in terms of distance, feed-back means connecting said third adjustable voltage multiplying means to said first and second voltage multiplying means whereby when said third voltage multiplying means is adjusted, said first and second voltage multiplying means are also adjusted, an adjustable signal generator calibrated in terms of the weight of the airplane, comparison means for comparing the output of the adjustable signal generator with the output of said second voltage summing means and comparing the output of said first voltage summing means with the output of said third adjustable voltage multiplying means, and means connected to said comparison means for indicating when the inputs to the comparison means are equal whereby when the output of the third adjustable voltage multiplying means is adjusted so it equals the output from the first voltage summing means the location of the center of gravity of the airplane can be read on the calibrations of the third voltage multiplying means, and the said adjustment of the third voltage multiplying means acting through said feed-back means on said first and second voltage multiplying means causes the output of the second voltage summing means to be equal to the indicated load carried by the port and starboard landing gears and the third ground support taking into account the effect of wind produced lift acting on the port and starboard landing gears and on the third ground support whereby when the output of the adjustable signal generator is adjusted until it equals the output from the second voltage summing means the weight of the airplane can be read on the calibrations of the adjustable signal generator.

7. The combined weight and center of gravity indicator described in claim 6 wherein said first and second voltage summings means are first and second summing amplifiers.

8. The combined weight and center of gravity indicator described in claim 7 wherein said comparison means is a third summing amplifier.

9. The combined weight and center of gravity indicator described in claim 8 wherein said first, second and third adjustable voltage multiplying means are each linearly wound first, second and third potentiometers.

10. The combined weight and center of gravity indicator described in claim 9 wherein said feed-back means is a common shaft on which the sliders of the first, second and third potentiometers are mounted whereby when the slider of said third potentiometer is adjusted said shaft moves to adjust the sliders of the first and second potentiometers.

11. The combined weight and center of gravity indicator described in claim 6 wherein the input to said second voltage summing means also includes a potential proportional to the unsprung weight of the port and starboard landing gears and the input to said first voltage summing means includes a potential proportional to the unsprung weight of the third ground support.

12. The combined weight and center of gravity indicator described in claim 6 including means associated with each transducer for compensating the output of each transducer for the angle the landing gear or ground support makes with a perpendicular to the longitudinal axis of the body of the aircraft.

13. The combined weight and center of gravity indicator described in claim 12 wherein the landing gears and third ground support includes a shock absorber consisting of a strut cylinder and a piston slidably mounted therein, and wherein each load transducer is a pressure transducer mounted in the strut cylinders of the port and starboard landing gears and the third ground support.

14. A combined weight and center of gravity indicator for an airplane having port and starboard landing gears and a third landing gear in longitudinally spaced relation to a line connecting said port and starboard landing gears where the port and starboard landing gear includes a shock absorber consisting of a strut cylinder and a piston slidably mounted therein, comprising a computing circuit, said computing circuit designed to indicate the weight of the airplane and its center of gravity when voltages functionally related to the weight carried by each of said landing gears is fed into the circuit, said circuit having first means for converting the average lift on the airplane caused by wind blowing over its aerodynamic surfaces into an electrical potential, said circuit having second means for obtaining electrical potentials proportional to the effect of said lift on each landing gear, said circuit having third means for introducing a voltage into the circuit for correcting the indicated weight carried by the landing gears by the angle the landing gears make with the longitudinal axis of the airplane, a pressure transducer connected to each of said strut cylinders for converting the pressure in each strut cylinder to a voltage proportional to said pressure, the output voltage from each pressure transducer connected to said computing circuit whereby since the output voltage from each pressure transducer is proportional to the pressure in the strut cylinders and the pressure in the struct cylinders is related to the weight carried by the landing gears the output voltage from each pressure transducer is related to the weight carried by the associated landing gear, the output voltage from each pressure transducer added to the electrical potential proportional to the lift on each associated landing gear and the correction voltage for the angle the landing gears make with the longitudinal axis for providing a corrected voltage proportional to the weight carried by each landing gear, said corrected voltage for each landing gear introduced into the circuit whereby, the weight and center of gravity of the airplane can be accurately determined by the computing circuit.

15. A combined weight and center of gravity indicator for an airplane having port and starboard landing gears and a third landing gear in longitudinally spaced relation to a line connecting said port and starboard landing gears comprising separate load transducers, each load transducer associated with a particular landing gear or ground support and mounted on and carried by said airplane for converting the load carried by said landing gears and said third ground support into separate electrical potentials, first means for converting the total lift force caused by wind blowing over the aerodynamic surfaces of the airplane into an electrical potential, first and second adjustable voltage multiplying means connected to said first means for multiplying said electrical potential representing the total lift force on the airplane by any desired fraction, a primary summing amplifier associated with each load transducer, one input to each of said primary summing amplifiers comprising the output from a load transducer, said first adjustable voltage multiplying means comprising another input to the primary summing amplifier connected to the load transducer associated with said third landing gear, and said second adjustable voltage multiplying means connected to the inputs of the other primary summing amplifiers whereby the output of each primary summing amplifier is the summation of the output voltage of the associated load transducer and the voltage multiplying means connected to the input of the primary summing amplifier, a secondary summing amplifier, the outputs of all the primary summing amplifiers connected to the input to the secondary summing amplifier, a third adjustable voltage multiplying means connected to the output of said secondary summing amplifier for multiplying the output of said secondary summing amplifier by any desired fraction, said third adjustable voltage multiplying means calibrated in terms of distance, feed-back means connecting said third adjustable voltage multiplying means to said first and second voltage multiplying means whereby when said third voltage multiplying means is adjusted said first and second voltage multiplying means are likewise adjusted, an adjustable signal generator calibrated in terms of the weight of the airplane, comparison means for comparing the output of the adjustable signal generator with the output of the second summing amplifier, and for comparing the output of the first summing amplifier with the output of the third adjustable voltage multiplying means, and means connected to said comparison means for indicating when the inputs to said comparison means are equal whereby when the third adjustable voltage multiplying means is adjusted until its output equals the output of the first summing amplifier the location of the center of gravity of the airplane can be read on the calibration of the third voltage multiplying means, and the said adjustment of the third voltage multiplying means acting through said feed-back means on said first and second voltage multiplying means causes the output of the second voltage summing means to be equal to the indicated load carried by the landing gears taking into account the effect of wind produced lift on the landing gears, whereby when the adjustable signal generator is adjusted until its output equals the output from the second summing amplifier the weight of the airplane can be read on the calibrations of the adjustable signal generator.

16. The combined weight and center of gravity indicator described in claim 15 wherein said first, second and third adjustable voltage multiplying means are each linearly wound first, second and third potentiometers and said feed-back means is a common shaft on which the sliders of said first, second and third potentiometers are mounted whereby when the slider of said third potentiometer is adjusted said shaft moves to adjust the sliders of the first and second potentiometers.

17. The combined weight and center of gravity indicator described in claim 16 including combined means for taking into account the effect of the angle of attack on the airplane on the wind produced lift and on the angle the landing gears make with a perpendicular to the longitudinal axis of the body of the airplane.

18. The combined weight and center of gravity indicator described in claim 17 including means connected to the indicator for introducing corrections for the unsprung weight of the landing gears.

19. The combined weight and center of gravity indicator described in claim 18 wherein each landing gear includes a strut cylinder and a piston slidably mounted therein and each load transducer is a pressure transducer mounted in the strut cylinders of the port and starboard landing gears and the third landing gear.

20. The combined weight and center of gravity indicator described in claim 19 wherein said comparison means is a third summing amplifier, and a switch movable into alternate positions for alternately connecting the adjustable signal generator and the output of said second summing amplifier to the input of said third summing amplifier or connecting the output of said first summing amplifier and the output of said third potentiometer to the input of said third summing amplifier, and said means connected to said comparator comprises a meter connected to the output of said third summing amplifier for indicating when the inputs to the third summing amplifier are equal.

21. A combined weight and center of gravity indicator for an airplane having port and starboard landing gears and a third ground support in longitudinally spaced relation to a line connecting said port and starboard landing gears comprising separate load transducers, each load transducer associated with a particular landing gear or ground support and mounted on and carried by said airplane for converting the load carried by said landing gears and said third ground support into separate electrical potentials, first means for converting the total lift force caused by wind blowing over the aerodynamic surfaces of the airplane into an electrical potential, first and second adjustable voltage multiplying means connected to said first means for multiplying said electrical potential representing the total lift force on the airplane by any desired fraction, a first voltage summing means, the output of the load transducer associated with said third ground support serving as one input to said first voltage summing means and the output of said first adjustable voltage multiplying means serving as the other input to said first voltage summing means, a second voltage summing means, the output potentials of the load transducers associated with said port and starboard landing gears, said third ground support, and the output of said first and second voltage multiplying means serving as the input to said second voltage summing means, a third adjustable voltage multiplying means connected to the output of the second voltage summing means for multiplying the output of said second voltage summing means by any desired fraction, said third adjustable voltage multiplying means calibrated in terms of distance, feed-back means connecting said third adjustable voltage multiplying means to said first and second voltage multiplying means whereby when said third voltage multiplying is adjusted said first and second voltage multiplying means are also adjusted, an adjustable signal generator calibrated in terms of the weight of the airplane, comparison means for comparing the output of the adjustable signal generator with the output of said second voltage summing means and for comparing the output of said first voltage summing means with the output of said third adjustable voltage multiplying means, and means connected to said comparing means for indicating when the output of the third adjustable voltage multiplying means is adjusted so it equals the output from the first voltage summing means the location of the center of gravity of the airplane can be read on the calibrations of the third voltage multiplying means and the said adjustment of the third voltage multiplying means acting through said feed-back means on said first and second voltage multiplying means causes the output of the second voltage summing means to be equal to the indicated load carried by the port and starboard landing gears and said third ground support with corrections for the effect of the wind produced lift acting on the port and starboard landing gears and on the third ground support whereby when the output of the adjustable signal generator is adjusted until it equals the output from the second voltage summing means the weight of the airplane can be read on the calibrations of the adjustable signal generator.

22. A center of gravity indicator for an airplane having port and starboard landing gears and a third ground support in longitudinally spaced relation to a line connecting said port and starboard landing gears comprising separate load transducers, a load transducer associated with each landing gear and said third ground support, said load transducers mounted on and carried by said airplane for converting the load carried by said landing gears and said third ground support into separate electrical potentials, a primary summing device associated each load transducer whereby each load transducer serves as one input to the associated primary summing device, first means for converting the total lift force caused by wind blowing over the aerodynamic surfaces of the airplane and acting through the center of gravity of the airplane into an electrical potential, said first means connected to a second means for converting the electrical potential representing the total lift force acting through the center of gravity of the airplane into separate electrical potentials, each of said separate electrical potentials proportional to the magnitude of the lift force acting on the port and starboard landing gears and on the third ground support respectively and serving as a second input to the primary summing device associated with each load transducer whereby each summing device has one input from an associated load transducer and one input from the electrical potential representing the effect of the wind produced lift force acting on the associated landing gear so that the output of each primary summing device is a potential related to the weight carried by the associated landing gear or ground support taking into account the effect of the wind produced lift on the particular landing gear or ground support, a secondary summing device, the output of the primary summing devices serving as the input to the secondary summing device whereby the output of the secondary summing device is a potential proportional to the weight of the airplane taking into account the effect of the wind produced lift acting on the airplane, adjustable voltage multiplying means connected to the output of said secondary summing device, said adjustable voltage multiplying means calibrated in terms of distance for multiplying the output signal of said secondary summing device by any desired fraction, a comparator, the output of the primary summing device associated with the third ground support and the output of said adjustable voltage multiplying means connected to said comparator, and means connected to said comparator for indicating when the output from the primary summing device associated with said third ground support equals the output from said adjustable voltage multiplying means whereby the location of the center of gravity of the airplane can be read on the calibrations of the adjustable voltage multiplying means.

23. A center of gravity indicator for an airplane having port and starboard landing gears and a third ground support in longitudinally spaced relation to a line connecting said port and starboard landing gears comprising separate load transducers, one load transducer associated with each landing gear and said third ground support, said load transducers mounted on and carried by said airplane for converting the load carried by said landing gears and said third ground support into separate electrical potentials, a primary summing device associated with each load transducer whereby each load transducer serves as one input to the associated primary summing device, first means for converting the total lift force caused by wind blowing over the aerodynamic surfaces of the airplane into an electrical potential, first and second adjustable voltage multiplying means connected to said first means for multiplying said electrical potential representing the said total lift force on the airplane by any desired fraction, the output of said first adjustable voltage multiplying means serving as a second input to the primary summing device associated with said third ground support, the output of said second voltage multiplying means serving as second inputs to the primary summing devices associated with said port and starboard landing gears, so that the output of each primary summing device is the summation of the output of the associated load transducer and the output of a voltage multiplying means, a secondary summing device, the output of the primary summing devices serving as the input to the secondary summing device, a third adjustable voltage multiplying means connected to the output of said secondary summing device for multiplying the output of said secondary summing device by any desired fraction, said third adjustable voltage multiplying means calibrated in terms of distance, feedback means connecting said third adjustable voltage multiplying means with said first and second voltage multiplying means whereby when said third voltage multiplying means is varied said first and second voltage multiplying means are varied, a comparator, the output of the primary summing device associated with said third ground support and the output of said third adjustable voltage multiplying means connected to the comparator, and means connected to the comparator for indicating when the adjustment of the third adjustable voltage multiplying means is such that its output equals the output of the primary summing device associated with said third ground support whereby the location of the center of gravity of the airplane can be read on the calibrations of the third adjustable voltage multiplying means and the said adjustment of the third adjustable voltage multiplying means adjusts said first and second voltage multiplying means in such a way the output of said first and second voltage multiplying means is a potential proportional to the effect of the wind produced lift on the third ground support and the port and starboard landing gears respectively.

24. A combined weight and center of gravity indicator for an airplane having port and starboard landing gears and a third landing gear in longitudinally spaced relation to a line connecting said port and starboard landing gears, comprising a computing circuit, said computing circuit designed to indicate the weight of the airplane and its center of gravity when voltages proportional to the weight carried by each landing gear is fed into the circuit, said circuit having a transducer in each landing gear for causing a voltage related to the weight carried by each landing gear, said circuit having first means for converting the average lift on the airplane caused by wind blowing over its aerodynamic surfaces into an electrical potential, said circuit having second means for obtaining electrical potentials proportional to the effect of said lift on each landing gear, said circuit having third means for introducing a voltage into the circuit for correcting the indicated weight carried by each landing gear by the angle the landing gears make with the longitudinal axis of the airplane, the voltage generated by each transducer added to the electrical potential proportional to the lift on each associated landing gear and the correction voltage for the angle the landing gears make with the longitudinal axis for providing a corrected voltage proportional to the weight carried by each landing gear, said corrected voltage for each landing gear introduced into the circuit whereby the weight and center of gravity of the airplane can be accurately determined by the computing circuit.

25. A combined weight and center of gravity indicator for an airplane having port and starboard landing gears and a third landing gear in longitudinally spaced relation to a line connecting said port and starboard landing gears, comprising a computing circuit, said computing circuit designed to indicate the weight of the airplane and its center of gravity when voltages proportional to the weight carried by each landing gear are fed into the circuit, said circuit having a transducer associated with each landing gear for causing a voltage related to the weight carried by each landing gear, said circuit having first means for converting the average lift on the airplane caused by wind blowing over its aerodynamic surface into an electrical potential, said circuit having second means for obtaining electrical potentials proportional to the effect of said lift on each landing gear, the voltage generated by each transducer added to the electrical potential proportional to the lift on each associated landing gear for providing a corrected voltage more nearly proportional to the weight carried by each landing gear, said corrected voltage for each landing gear introduced into the circuit whereby the weight and center of gravity of the airplane can be determined by the computing circuit.

References Cited by the Examiner

UNITED STATES PATENTS

| 2,540,807 | 2/1951 | Berry | 73—65 |
|---|---|---|---|
| 3,203,234 | 8/1965 | Westcott et al. | 73—65 X |

OTHER REFERENCES

Seely, Samuel, Electronic Engineering, McGraw-Hill Book Co. Inc., New York, 1956. Chapter 6, section 2, pages 166–169 relied on.

RICHARD C. QUEISSER, *Primary Examiner.*

J. C. GOLDSTEIN, *Assistant Examiner.*